United States Patent [19]

Brauer et al.

[11] Patent Number: 5,433,872
[45] Date of Patent: * Jul. 18, 1995

[54] CABLE GREASE COMPOSITION AND ARTICLES INCORPORATING SAME

[75] Inventors: Melvin Brauer, East Brunswick; Jack C. Chu, East Windsor, both of N.J.

[73] Assignee: CasChem, Inc., Bayonne, N.J.

[*] Notice: The portion of the term of this patent subsequent to Sep. 20, 2011 has been disclaimed.

[21] Appl. No.: 182,923

[22] Filed: Jan. 18, 1994

Related U.S. Application Data

[63] Continuation-in-part of Ser. No. 72,649, Jun. 4, 1993, Pat. No. 5,348,669, which is a continuation of Ser. No. 542,388, Jun. 22, 1990, abandoned.

[51] Int. Cl.$^6$ .............. C10M 107/32; C10M 113/10; C10M 113/12; H02G 15/00
[52] U.S. Cl. ..................... 252/28; 385/100; 523/173
[58] Field of Search ............. 252/28; 385/100; 523/173

[56] References Cited

U.S. PATENT DOCUMENTS

| | | | |
|---|---|---|---|
| 3,903,013 | 9/1975 | Foord et al. | 252/317 |
| 4,331,379 | 5/1982 | Oestreich et al. | 350/96.23 |
| 4,370,023 | 1/1983 | Lange et al. | 350/96.23 |
| 4,411,951 | 10/1983 | Barsotti | 428/328 |
| 4,416,790 | 11/1983 | Schurmann et al. | 253/62 |
| 4,497,918 | 2/1985 | Wason | 523/220 |
| 4,645,298 | 2/1987 | Gartside, III | 350/96.23 |
| 4,695,128 | 9/1987 | Zimmerman et al. | 350/96.23 |
| 4,701,016 | 10/1987 | Gartside, III et al. | 350/96.23 |
| 4,705,571 | 11/1987 | Lange et al. | 106/287 |
| 4,711,523 | 12/1987 | Iri et al. | 350/96.23 |
| 4,741,684 | 3/1988 | Cornelison et al. | 425/114 |
| 4,744,631 | 5/1988 | Eichenbaum et al. | 350/96.23 |
| 4,757,100 | 7/1988 | Wichelhaus et al. | 523/173 |
| 4,770,489 | 9/1988 | Saito et al. | 350/96.23 |
| 4,786,137 | 11/1988 | Cornelison et al. | 350/96.23 |
| 4,792,422 | 12/1988 | Cornelison et al. | 264/1.5 |
| 4,810,395 | 3/1989 | Levy et al. | 252/28 |
| 4,839,970 | 6/1989 | Goetze et al. | 350/96.23 |
| 4,898,451 | 2/1990 | Story | 350/96.23 |
| 4,921,413 | 5/1990 | Blew | 425/96.23 |
| 5,285,513 | 2/1994 | Kaufman et al. | 523/173 |
| 5,348,669 | 9/1994 | Brauer et al. | 523/173 |

FOREIGN PATENT DOCUMENTS 1435007  5/1976  United Kingdom .

OTHER PUBLICATIONS

E. Braithwaite, "Lubrication and Lubricants", Elsevier Pub. Co., 1967 pp. 181–183, 223–228.

Polyurethanes 90, J. W. Reisch et al., pp. 371–374, "Polyurethane Sealants and Cast Elastomers with Superior Physical Properties". (Date unknown).

*Primary Examiner*—Jerry D. Johnson
*Attorney, Agent, or Firm*—Pennie & Edmonds

[57] ABSTRACT

A grease composition for use as a cable filling material which contains about 75 to 95 parts by weight of a base component of a liquid or semi-solid polyol having a molecular weight of at least 4000 and a reduced amount of mono-unsaturated compounds, about 1 to 15 parts by weight of a thickening agent such as colloidal particles of silica, and between 1 and 5 parts by weight of an antioxidant. Optionally, a thermoplastic elastomer can be added to improve bleed resistance.

15 Claims, No Drawings

CABLE GREASE COMPOSITION AND ARTICLES INCORPORATING SAME

CROSS REFERENCE TO RELATED APPLICATIONS

This application is a continuation-in-part of application Ser. No. 08/072,649, filed Jun. 4, 1993, now U.S. Pat. No. 5,348,669, which is a continuation of application Ser. No. 07/542,388, filed Jun. 22, 1990, now abandoned.

TECHNICAL FIELD

The present invention relates to a colloidal particle filled polyol base component grease composition and to articles such as sheathed communication cables, especially those containing optical fiber bundles, which include grease compositions such as those disclosed herein.

BACKGROUND OF THE INVENTION

A grease typically is a solid or semi-liquid substance which includes a thickening or gelling agent in a liquid carrier. Almost any oil having lubricating properties may be used with a suitable gelling agent to make a grease. Petroleum oils, fatty oils such as castor oil, polyalkylene glycols, synthetic diesters, silicones, fluorocarbons and polyphenyl ethers are all found in commercial lubricating greases. (See, e.g., Braithwaite, "Lubrication and Lubricants," Elsevier Publishing Co., 1967, pages 181-183 and 223-228). The gelling agent frequently used in greases include fatty acid soaps, clays, silica, organic dyes, amides, and urea derivatives. The gelling agent forms a network structure in which the carrier is held by capillary forces.

When a low stress is applied through a sample of grease, the material acts substantially like a solid. If a stress above a critical value is supplied, the material flows and viscosity decreases rapidly. This decrease in viscosity is largely reversible since it is typically caused by the rupture of network junctions between filler particles, and these junctions can reform following the removal of the source of the stress.

A desirable property of the grease is the absence of syneresis, i.e., its ability to maintain uniform consistency. Generally, syneresis is controlled by assuring dispersion of an adequate amount of the gelling agent throughout the composition.

Grease compositions have been used as cable filling material in both conventional (electrical) communications as well as for optical fiber cables. U.S. Pat. No. 4,701,01,5 discloses grease compositions comprising an oil, a gelling agent such as colloidal particles of silica or clay, and optionally a bleed inhibitor. The oils which are disclosed as being useful in the compositions of that patent include certain naphthenic or paraffinic oils having certain specific gravities and properties, polybutene oils of similar specific properties, triglyceride based vegetable oils, polypropylene oil, chlorinated paraffin oils, and polymerized esters. The colloidal particle filler material preferably comprises silica particles such as fumed silica or precipitated silica. Preferred bleed inhibitors include styrene-rubber, styrene rubber-styrene, or other block polymers, and/or semi liquid rubbers such as high viscosity polyisobutylene. Other ingredients such as thermal oxidative stabilizers optionally may be present.

One disadvantage of the compositions of the above cited patent is that relatively large amounts of silica must be included to meet the appropriate service requirements for the grease. Thus, relatively stiff greases are obtained which are not entirely suitable for such fiber optic cables. In particular, such stiff greases will affect attenuation (microbending) of the fiber optic cable at relatively low temperatures (i.e., below about 50° F.). Furthermore, if the amount of silica is reduced to lower the viscosity of the grease, the shear characteristics of the formulation are reduced to a value which is less than desirable. Moreover, such a reduction in silica often results in syneresis.

U.S. Pat. No. 4,839,970 to Goetze et al. discloses a filling compound that can be utilized to fill light waveguide leads or light waveguide cable cores. The filling compound comprises polypropylene glycol to which a second compound chosen from the group consisting of silica, aluminum hydroxide, aluminum oxide, a halogen containing organic compound, or mixtures thereof, is added as a thixotropic agent. The filling compound consists of between approximately 50 to about 99 weight percent of polypropylene glycol and between approximately 50 to about 1 weight percent of the second compound. Finely distributed fumed silica that acts as a thixotropic agent is used as the second compound, and the polypropylene glycol has an average molecular weight of between approximately 2000 to about 3500. In a further embodiment, the filling compound includes an antioxidant which is present in an amount of approximately 0.1 to about 1 weight percent of the filling compound.

While the greases of that patent can be used to seal optical cable, they are incapable of meeting current industry specifications which require improved performance with respect to bleed resistance and oxygen inhibition resistance.

Accordingly, a need exists for novel polyol containing grease compositions which are capable of providing an optimum balance of viscosity and shearing characteristics such that the compositions are suitable for use with fiber optic cables even at lower temperatures. In addition, these formulations must provide properties which are capable of passing the appropriate drip tests, paper bleeding tests, and syneresis requirements for such cable filling greases.

SUMMARY OF THE INVENTION

The present invention relates to a gel for use in an optical fiber buffer tube, which gel contains between about 75 and 95 parts by weight of a base component of a polyol having a molecular weight of at least 4,000, and between about 2 and 15 parts by weight of a thickening agent, such as colloidal particles.

Preferably, the polyol is a polyether polyol having a molecular weight of at least 4,000 up to as high as about 25,000. Preferably, the molecular weight is between 6,000 and 15,000 and more preferably between 8,000 and 12,000. To achieve these molecular weights, the polyols generally have a reduced, relatively low content of unsaturated mono compounds, such as less than 0.05 meq/g and preferably less than 0.03 meq/g.

The preferred amount of polyol to be used in these compositions ranges between 80 and 95 parts by weight. Polyoxypropylene glycols are the most preferred polyols. The colloidal particles, which preferably include silica, clay or mixtures thereof, may be present in an amount of between about 4 to 12 parts by weight and preferably between about 6 and 11 parts by weight.

The composition also includes between about 1 and 5 parts by weight of an antioxidant to improve the high temperature properties of the grease composition. A preferred antioxidant, Irganox 245, is used in an amount of about 1 to 3 parts by weight, so that the composition can withstand at least about 10 minutes at 190° C. in a pure oxygen environment.

The composition may optionally include a thermoplastic elastomer in the amount effective to act as a bleed inhibitor but in an amount less than 15 parts by weight. Many different thermoplastics elastomers such as polyurethane elastomers, preferably those which include a pendent or extra-linear

group, polyester elastomers, and polyterephthalates can be used.

DETAILED DESCRIPTION OF THE INVENTION

The polyol containing gels of the present invention are ideally suited for use in connection with the filling of optical fiber cable, such as those disclosed in U.S. Pat. Nos. 4,645,298, 4,701,016, 4,711,523 and 4,744,631. To the extent necessary to understand the structure of such cables, these patents are expressly incorporated herein by reference thereto.

The present gel comprises at least two major components, namely, (1) a polyol having a molecular weight of at least 4,000, and (2) an agent which imparts thickening to the polyol or ester, such as colloidal particles. An antioxidant is generally used to improve the high temperature properties of the composition. If desired, although not critical to the invention, a bleed inhibitor of a thermoplastic elastomer can be added to the previously described components.

The preferred polyols of the invention include polyether polyols including polyoxypropylene glycol or polytetramethylene glycol, diol, triol, tetrol, etc., as well as hydroxyl terminated polyethers having a molecular weight of at least about 4,000. The upper limit for molecular weight is not critical, provided that the polyol is a liquid or at least is a semi-solid at room temperature. Solid polyols are more difficult to formulate and are not preferred for that reason. An upper limit for molecular weight can be as high as about 20–25,000. Those polyols having a molecular weight of about 6,000 to 15,000, and more particularly about 8,000 to 12,000, are preferred.

It is advantageous to use polyols having low levels of unsaturated mono-compounds. Polyalkylene oxides or polyether polyols for making polyurethanes are typically prepared from the polymerization of epoxides (most commonly propylene oxide or ethylene oxide) with an alkaline base catalyst such as potassium hydroxide. Polyhydric initiators of varying functionality are oxyalkylated to prepare polyether polyols with varying functionality. For example, difunctional alcohols such as propylene glycol, dipropylene glycol, or tripropylene glycol are commonly used as starters to prepare difunctional polyether polyols (diols). Trifunctional alcohols like glycerol and trimethylol propane are commonly used to prepare trifunctional polyether polyols (triols).

The base catalyzed polymerization of propylene oxide results in a competitive reaction between the desired attack at the oxirane ring, to form polyols by ring-opening polymerization, and a side reaction in which the base attacks at the methyl group, to form allyl alcohol. The allyl alcohol then acts as a monofunctional initiator, which propoxylates to form monol.

The amount of monol in a polyol is measured by titration of the unsaturated end groups and reported as milliequivalents of unsaturation per gram of polyol. Since the molecular weight of the monol is less than one third the molecular weight of the triol, a small amount of terminal unsaturation translates into high mole percentages of monol. For example, a 6200 molecular weight poly(propylene oxide) triol capped with 5% ethylene oxide having an unsaturation value of 0.095 meq/g means the polyol contains 42.5 mole % monol or 20 weight % monol.

The monol species with unsaturated end groups act as chain terminators in elastomer formation. This limits the molecular weight of the elastomer and lowers the physical properties of the polyurethane. The formation of terminally unsaturated end groups results in a substantial loss in hydroxyl functionality. For example, a 6200 molecular weight triol with 0.095 meq/g of unsaturation has a calculated functionality of only 2.14.

In polyols prepared with base catalysts, the amount of unsaturation formed increases as a direct function of equivalent weight and eventually conditions are established in which the amount of unsaturation being formed balances the additional molecular weight of the growing chain. The rate of unsaturation formation with KOH catalysis can be lowered by using lower temperature and longer reaction times but this makes the process prohibitively expensive. In actual practice, 2200 is about the highest equivalent weight obtained with KOH catalysis (4400 MW diol, 6600 MW triol), and these polyols typically contain more than 0.09 meq/g of unsaturation.

In contrast, with double metal cyanide (DMC) catalysts, the amount of unsaturation formed increases very slowly with increasing polyol equivalent weight, which allows the synthesis of ultra high molecular weight polyols containing low levels of monol, i.e., less than about 0.05 meq/g of unsaturation, and typically about 0.015 to 0.03 meq/g. Arco Chemicals as their R-18XX series, as well as from Polyols of this type are commercially available from Olin Corporation, as their POLY-L ™ polyols. Such polyols have been found to be very useful in the present cable grease compositions.

The preferred polyether polyols are polyether diols, particularly polyoxypropylene diols. Generally, these polyether diols are prepared by condensing a large excess of an alkylene oxide, such as ethylene oxide or propylene oxide with a glycol, as is well known in the art. As noted above, to achieve a relatively low amount of unsaturated mono compounds, the reaction is conducted in the presence of double metal cyanide catalysts. The glycol can be a diol, such as the alkylene glycols, e.g., ethylene or propylene glycol, or an ether glycol, such as diethylene glycol. The Arco R-18XX series are the most preferred.

Among the thickening agents which are useful in the present invention are colloidal particles. Colloidal silica, either hydrophilic or hydrophobic, preferably a hydrophobic fumed silica having a BET surface area between about 50 and about 40 m²/gm, is preferred. An example of a hydrophobic fumed silica useful in the practice of the invention is a polydimethylsiloxane-coated fumed silica having a BET surface area of about 80–120 m²/gm, containing about 5% b.w. carbon, available from the Cabot Corporation of Tuscola, Ill., under the trade designation Cab-O-Sil TS 720. An exemplary hydrophitic colloidal material is fumed silica with a BET surface area of about 175–225 m²/gm, nominal particle size of 0.012 pm, specific gravity 2.2, available from the Cabot Corporation under the trade designation Cab-O-Sil M-5. Mixtures of these materials also may be used. Other colloidal fillers useful in the practice of the invention are precipitated silicas and clays such as bentonites, with or without surface treatment. Other inorganic colloidal particles may also be used, if desired, although the silicas are preferred.

Among the thermoplastic elastomers that may optionally be employed in the compositions according to the invention are the polyurethane elastomers which are based on polyether and/or polyester polyurethanes. In particular, the polyol used to form the polyurethane should be one of the polyols described above for optimum compatibility. Alternatively, any polypropylene glycol based polyether polyurethane can be used. Polyester polyurethanes, polyester elastomers or acrylic elastomers can also be used.

The thermoplastic elastomers are non-reactive, heat processable materials. One preferred elastomer is MIL-LATHANE E-34, a linear thermoplastic millable polyurethane elastomer which has a pendent group that contains an aliphatic, non-benzenoid

moiety. Examples of these type thermoplastic elastomers are found in U.S. Pat. No. 3,043,807. This component, which is not crosslinked, can be used to impart tack to the composition, which property enhances the ability of material to resist dripping after placement in the cable.

Other suitable elastomers include the LOMOD polyester and polyester copolymer elastomers made by General Electric, VALOX, a polybutylene terephthalate made by General Electric, the PELLATHANE thermoplastic polyurethanes made by Dow Chemical and the ESTANE thermoplastic polyurethanes made by B. F. Goodrich. These elastomers are generally used in an amount of about 1 to 15 parts by weight.

By following the combination of ingredients disclose above, the grease of the present invention is characterized as being non-dripping with high penetration and a low yield stress. The high penetration capabilities as a grease allows a better fluidity. That is, lower viscosities may be used so that the cable may be more easily filled with the grease. Furthermore, the present invention provides three distinct advantages over prior art formulations:

1) the processing properties as noted above are exceptional in that the material can thin out as much as possible under heat and shear for easy cable filling. Thus, the grease of the invention fills the cable more easily and faster and thus avoids microbending difficulties which can cause attenuation in fiber optic cable.
2) Conventional formulations at low viscosity require a reduced silica content to achieve the same degree of viscosity. However, this reduction causes syneresis, i.e., the gel becomes unstable and separates into an oil layer and a filler layer. This separation causes difficulties in the static properties of the fiber optic cable. The formulations of the present invention have not exhibited syneresis in any tests conducted so far.

When introducing the grease into the fiber optic cable, it is important to achieve as low a viscosity as possible so that the fibers are not moved. This is achieved by introducing the grease under high shear into the cable. This can be accomplished by retaining the grease composition in a reservoir such as a drum upon which a drum pump of the piston type is attached. This pump causes low shear and movement of the grease out of the drum and into a conduit or pipe which is traced and heated to maintain the temperature of the grease therein to at least about 80° C. The grease then is directed through a gear pump which is operated under high shear conditions of about 5,000 to as high as 20,000 revolutions per sec. A pipe exiting the gear pump directs the grease into a die which is positioned about the fiber optic cable in a manner such that the grease is extruded into the cable around the fibers. The grease is extruded into the cable at temperatures of about 500° to 600° F., preferably at about 550° F. Unlike prior art greases, the formulations of the invention are relatively stable at that temperature.

As noted above, an antioxidant may be used to impart enhanced stability to the grease at such elevated extruding temperatures. The most preferred antioxidant is Ciba-Geigy Irganox 245, a sterically hindered phenolic compound in the form of a white crystalline powder having the empirical formula $C_{34}H_{50}O_8$. This compound is also known as triethylene glycol bis[3-(3'-tert-butyl-4'-hydroxy-5'-methylphenyl)propionate] or ethylene bis(oxyethylene)bis(3-tert-butyl-hydroxy-5-methyl hydro cinnamate). Other bis hindered phenol rings connected by a polyether linkage should provide comparable results, but the Irganox 245 is preferred due to its ready commercial availability.

To determine whether or not a particular antioxidant is suitable for use in the present invention, a modified Belcore oxygen inhibition test may be conducted. A sample of the grease is put in a calorimeter in a boat under nitrogen pressure and is conditioned at 190° C. Thereafter, pure oxygen is pumped into the calorimeter and changes in the grease are measured. In order to provide a suitable grease, the material must be able to withstand approximately 10 minutes at 190° C. in a pure oxygen environment. The use of 1% by weight of Irganox 245 in the grease formulations of the present invention allows tire grease to withstand approximately 8 minutes in the modified Belcore test. Increasing that level to about 2% increases the resistance of the grease to the test environment to about 12 minutes. Finally, an addition of about 3% Irganox 245 allows the greases of the present invention to achieve a 30 minute or higher rating in the previously described test: this is an optimum condition which is quite unexpected for these types of materials.

Thus, the compositions of the present invention are capable of passing the appropriate tests for obtaining suitable grease compositions for filling fiber optic cable. These tests include a syneresis observation, wherein the present invention exhibits no separation, an 80° C. drip test, and a bleeding test utilizing a 0.1 millimeter penetrant at 25° C.

A conventional optical fiber buffer tube or cable includes a plurality of glass fiber cores, each of which typically has a polymerized coating thereon for moisture protection. These fiber cores are color coded so that operators can select the proper ones for splicing or other connections. Thus, a pigmented material, usually of an uncrosslinked PVC material, is applied to the exterior of each fiber core to impart a desired color thereto. The fiber cores are collected and placed into a cable. Thus, the cable grease must be one which is compatible with the ink. For example, inks are soluble in certain polyols, and can "run" or dissolve therein. To minimize this problem the polyol should have a molecular weight of at least 4,000 and preferably at least 6,000 for compatability with these types of ink.

The syneresis observation is conducted as follows: the formulations are prepared, retained in a suitable container, and observed for oil separation over a period of one month. The most preferred formulations are those which exhibit no syneresis over a period of at least six months, since it is unlikely that any syneresis will be encountered for longer times of use of the grease.

The 80° C. drip test is described as follows:
1. Use a 12 inch long buffer tube;
2. Insert three 12 inch long optical fibers into the tube;
3. Fill the tube with the grease to be tested by injecting the sample of the composition with a 5 cc syringe. No air should be trapped in the tube;
4. Place the tube in a horizontal position for 2 hours at room temperature;
5. Place the tube in a horizontal position for 2 hours at 80° C. (A forced air oven is preferably used);
6. Clean any amount of grease that comes out of the tips of the tube due to thermal expansion;
7. Weigh a clean, empty aluminum dish in grams (W1);
8. Place the tube in a vertical position at 80° C.;
9. Place the aluminum dish under the tube in such a way that the tip of the tube is a few millimeters from the center of the bottom of the dish;
10. Leave the system at 80° C. for 24 hours;
11. Reweigh the aluminum dish in grams (W2). Inspect the dish for any traces of liquid;
12. The difference in weight (W2−W1) is the dripping reading in grams.

The paper bleeding test is described as follows:

MATERIALS 1. 5 ml syringe
2. 11 cm diameter, type 1 filter paper
3. Pyrex watchglass (12 cm diameter)
4. 600 ml Pyrex beaker
5. Lab spatula
6. Analytical balance
7. Tweezers
8. Scissors
9. Forced draft oven set to 80° C.

PROCEDURE

1. Load the grease compound into the syringe with a spatula. Slowly press the plunger to eliminate air bubbles.
2. Cut a 1 in. by 1 in. filter paper square; weight (WT 1) and record (to 0.0001 grams).
3. Slowly apply 1 ml of the compound from the syringe onto the filter paper square in a circular dab. (Leave some room around the edges to allow the dab to spread.) Weigh this "sample square" and record this value as WT 2.
4. Weigh an 11 cm diameter filter paper circle (WT 3), and place it on the watchglass. Put the "sample square" on the center of the filter paper, and cover with a 600 ml beaker.
5. Let the sample lie undisturbed at room temperature for 16 hours.
6. Weigh the sample square (WT 2A) and the large filter paper circle (WT 3A).
7. Replace the sample square under the beaker, and place the entire assembly in the oven. Do not disturb for 24 hours.
8. Remove from the oven and allow to cool for 5 minutes on a marble surface. Weigh the sample square (WT 2B) and the filter paper circle (WT 3B). Note any color changes.
9. Discard sample square and filter paper.
10. When handling the sample square and the filter paper circle, use only tweezers. Take care to keep moisture and all foreign particles away from the sample square.

CALCULATIONS

1. Initial Weight=(WT 2)−(WT 1)
2. Weight Loss=(WT 2)−(WT 2A or WT 2B)
3. % Weight Loss=Weight Loss×100/Initial Weight
4. Filter Paper Weight Gain=(WT 3A or WT 3B)−(WT 3)
5. Volatile Weight a. (Weight Loss)−(Filter Paper Weight Gain) if >0 or b. 0, if (Weight Loss)−(Filter Paper Weight Gain) ≦0
6. % Volatile Weight=Volatile Weight×100/Initial Weight
7. % Nonvolatile Separation Weight Loss % Volatile Weight "A" values are used to calculate weight change after 16 hours at room temperature. "B" values are used to determine weight change after the additional 24 hours at 80° C.

MEASUREMENT ERROR

Due to repeated handling of the sample, some error should be expected, especially in calculating volatile weight loss at room temperature. All weights should be recorded to the nearest 0.0001 gram. All calculated results should be reported to the nearest whole number. At least three samples should be tested simultaneously per compound to be evaluated. The resulting percentage values can then be averaged to determine the % Weight Loss and % Nonvolatile Separation.

EXAMPLES

The scope of the invention is further described in connection with the following examples which are set forth for the sole purpose of illustrating the various preferred embodiments of the invention and which are not to be construed as limiting the scope of the invention in any manner. In these examples all parts given are by weight unless otherwise specified.

Examples 1–5 (Comparative)

Formulations using hydrocarbon oils have been prepared as representative of the prior art. Examples 1–4 are greases based on hydrocarbon oil, specifically, polyalpha olefin oil (PAOL).

Examples 1 and 2 compare the properties of the grease with different penetration (i.e., 310 vs. 390). Compositions with higher penetration showed worse bleeding and dripping.

Examples 2–4 compare properties with different oil viscosities. Generally, higher oil viscosity improves the bleeding, but the grease still failed the dripping tests with too high bleeding, whereas Example 3 failed with too high dripping. Example 2 failed both tests.

Examples 1–4 all failed one of bleeding or dripping, and/or syneresis.

From these examples, it was concluded that PAOLs (hydrocarbon oils or petroleum based oils) are unsuitable because they fail syneresis and dripping in general.

Examples 6–11

These examples are representative formulations of the present invention.

Examples 6–11 are greases based on polypropyleneoxy glycols (PPGs) of various molecular weight and functionality.

Examples 6–7 failed with too high bleeding and/or dripping. These examples indicate that the minimum acceptable molecular weight should be no less than about 3000 and preferably at least 4000.

Example 8 compares the effect of utilizing (PPG) to replace (PAOL) at the same viscosity level (example 3). A significant improvement in bleeding (50%), dripping and syneresis resulted. The grease of example 8 with PPG passed both bleeding, dripping and syneresis, while the (PAOL) grease failed both syneresis and dripping.

The effect of functionality is not clear: however, Examples 6 and 7 showed that no significant improvement was observed by increasing functionality from 2 to 3. The same can be observed by comparing Examples 8 and 9.

Examples 2 and 6 compare the low viscosity greases made with hydrocarbon to that with PPG-Improvement on bleeding and dripping tests resulted by replacing the hydrocarbon with the PPG. Thus, PPG surprisingly improved grease performance and made non-syneresis possible.

Examples 3 and 8 were compared with 5 and 11, respectively. For the hydrocarbon grease, the M5 silica improved syneresis and bleeding, but made the dripping worse. For the PPG grease, the M5 silica improved the bleeding while the dripping performance was retained. Thus, the M5 silica improves bleeding and syneresis but not the dripping.

Example 12

The syneresis observation for Examples 6–10 is conducted for an extended time. After a six month period, none of the formulations of these examples exhibited any oil separation (syneresis), thus indicating their suitability for providing long service lives.

Examples 13–15

The following samples were prepared for testing according to the modified Belcore test.

| COMPONENT | EXAMPLE (in parts per weight) | | |
|---|---|---|---|
| | 13 | 14 | 15 |
| Polypropylene Glycol | 89 | 87 | 87 |

| COMPONENT | EXAMPLE (in parts per weight) | | |
|---|---|---|---|
| | 13 | 14 | 15 |
| 4000 mol. wt. | | | |
| Silica particles Cab-O-Sil TS-720 | 10 | 10 | 10 |
| Antioxidant | | | |
| Irganox 1076 | 1 | 3 | — |
| Irganox 245 | — | — | 3 |
| Belcore Test Results (minutes) | 1.6 | 7.9 | 36 |

These tests show the unexpected performance achievable with the Irganox 245 antioxidant, whereby the use of three parts of this component enables the grease to withstand 36 minutes in the test. In general, however, the present invention discloses that greater amounts of antioxidant are needed compared to those taught by the prior art (e.g., by U.S. Pat. No. 4,839,970) in order to achieve the desired level of performance in the Belcore test. However, one skilled in the art can select the optimum amount of any particular antioxidant by routine testing.

Example 16

The following examples were prepared using higher molecular weight polyols that have a reduced level of mono unsaturated compounds. The specific procedure is as follows: 2.5 g (1%) of the antioxidant (Irganox 245) is dissolved in 222.5 g (89%) of polyol on a hot plate. The mix is cooled to room temperature and blended with 25 g (10%) silica (Cabot 720) until homogeneous. The mix is then taken out of the blender and milled twice on a three roll mill. Three fibers were tested in each grease as described above. Also performed was a paper oil bleeding test with the same greases. POLYOLS: Arco R-1857 (2,000 MW diol); Arco R-1885 (4,000 MW diol); Arco R-1897 (6,000 MW diol); Arco R-1819 (8,000 MW diol); Arco R-1818 (12,000 MW diol ); Arco R-1836 (15,000 MW diol ).

All gels were prepared as noted above, and were clear. The gel made with the 15,000 MW polyol was very, very thick.

The bleeding test was conducted for oil separation at 80° C. for the polyols of Example 16. Results were as follows:

| POLYOL | OIL SEPARATION AT 80° C. (%) |
|---|---|
| 2,000 MW | 27.4 |
| 4,000 MW | 15.4 |
| 6,000 MW | 9.2 |
| 8,000 MW | 5.2 |
| 12,000 MW | 3.5 |
| 15,000 MW | 0.7 |

The 2000 MW polyol, which was included as a comparative formulation, provided the worst performance regarding oil separation and was unsuitable. Generally, values below about 16.6% are acceptable, although the lowest values would be preferred. Since the viscosity of the gel increases as the molecular weight of the polyol is increased, the highest molecular weight polyols are not preferred for that reason. The polyols which provide the best combination of oil separation and viscosity are those having a molecular weight of between about 6,000 and 12,000. These polyols also provide very good compatibility with the optical fiber ink coatings.

Although the preferred embodiment of the present invention are well suited for the purposes disclosed, it is recognized that one skilled in the art can make various modifications without departing from the inventive aspects disclosed herein. For example, other colloidal particles, antioxidants or thermoplastic elastomers can be selected after conducting routine tests for optimum specific components and amounts. It is thus intended that the appended claims cover all such modifications which fall within the true spirit and scope of the invention.

TABLE 1

| | EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| CAB-O-SIL | TS720 | TS720 | TS720 | TS720 | TS720/M5 | TS720 | TS720 | TS720 | TS720 | TS720 | TS720/M5 |
| VISCOSITY OF BASE COMPONENT (cps) | 100 | 100 | 800 | 4000 | 200 | 220 | 800 | — | 1400 | 800 | 800 |
| TYPE OF COMPONENT | HYDRO-CARBON | HYDRO-CARBON | HYDRO-CARBON | HYDRO-CARBON | HYDRO-CARBON | PPG | PPG | PPG | PPG | PPG | PPG |
| MOL. WT OF BASE COMPONENT | — | — | — | — | — | 1000 | 2000 | 4000 | 3000 | 6700 | 4000 |
| FUNCTIONALITY | — | — | — | — | — | 3 | 2 | 2 | 3 | — | 2 |
| WT. % OF BASE COMPONENT | 87 | 87.5 | 91 | 92 | 87 | 91 | 90.5 | 90 | 89 | 91.5 | 90 |
| WT. % CAB-O-SIL TS720 | 11 | 8.5 | 7 | 5 | 5.5 | 7 | 7.5 | 8 | 9 | 6.5 | 4 |
| WT. % CAB-O-SIL M5 | — | — | — | — | 5.5 | — | — | — | — | — | 4 |
| WT. % ANTIOXIDANT | 2 | 2 | 2 | 3 | 2 | 2 | 2 | 2 | 2 | 2 | 2 |
| PENETRATION @ 25° C. (0.1 MM) | 310 | 390 | 390 | 380 | 300 | 400 | 396 | 370 | 380 | 370 | 389 |
| PAPER BLEEDING @ 80° C. | 20 | 29 | 12 | 12 | 5 | 14 | 22 | 6 | 7 | 7 | 1.2 |
| DRIPPING @ 80° C. (g) | 0.03 | 1.05 | 0.01 | 0.34 | 0.17 | 0.14 | 0 | 0 | 0 | 0 | 0 |
| SYNERSIS, 1 MONTH | YES | YES | YES | NO | YES | NO | NO | NO | NO | NO | NO |

NOTES: Passing criteria for bleeding: less than 15%, preferably less than 10.
for dripping: less than 0.01, preferably zero.
for synersis: none (no)

What is claimed is:

1. A buffer tube gel consisting essentially of about 75 to 95 parts by weight of a polyol having a molecular weight of at least 4000 and no more than 0.05 meq/g of unsaturated mono-compounds; about 2 to 15 parts by weight of a thickening agent; and about 1 to 5 parts by weight of an antioxidant so that the composition has an oxidative induction time of at least about 10 minutes at 190° C. in a pure oxygen environment.

2. The gel of claim 1 wherein the thickening agent comprises colloidal particles.

3. The gel of claim 2 wherein the colloidal particles are silica, clay or a mixture thereof.

4. The gel of claim 2 wherein the colloidal particles comprise hydrophobic fumed silica, precipitated silica, clay or a mixture thereof.

5. The gel of claim 2 wherein the colloidal particles are present in an amount of about 4 to 12 parts by weight.

6. The gel of claim 1 wherein the polyol is present in an amount of between about 80 and 95 parts by weight and has a molecular weight of between 4,000 and 25,000.

7. The gel of claim 1 wherein the polyol has a molecular weight of between about 6,000 and 15,000 and a content of mono unsaturated compounds of no greater than 0.05 meq/g.

8. The gel of claim 1 wherein the polyol has a molecular weight of between about 8,000 and 12,000 and a content of mono unsaturated compounds of no greater than 0.03 meq/g.

9. The gel of claim 1 further consisting essentially of up to about 15 parts by weight of an elastomer to act as a bleed inhibitor.

10. The gel of claim 9 wherein the elastomer is a polyurethane elastomer.

11. The gel of claim 10 wherein the polyurethane elastomer includes a pendent or extra-linear terminally unsaturated

group.

12. The gel of claim 1 wherein the antioxidant is a sterically hindered phenolic compound.

13. The gel of claim 1 wherein the antioxidant has bis hindered phenol rings connected by a polyether linkage.

14. The gel of claim 1 wherein the antioxidant is triethylene glycol bis[3-(3'-tert-butyl-4'-hydroxy-5'-methyl phenyl)propionate].

15. An article of manufacture comprising a buffer tube having a sheath, the buffer tube gel of claim 1 located within the sheath and plurality of optical fibers located within the cable sheath in contact with the gel.

* * * * *